Oct. 31, 1967　　　　J. HULMAN ETAL　　　　3,350,639
MULTIDIGIT DECIMAL PRESENTATION MEANS FOR DIGITAL METERS
Filed Jan. 9, 1963　　　　　　　　　　　　　　　　2 Sheets-Sheet 1
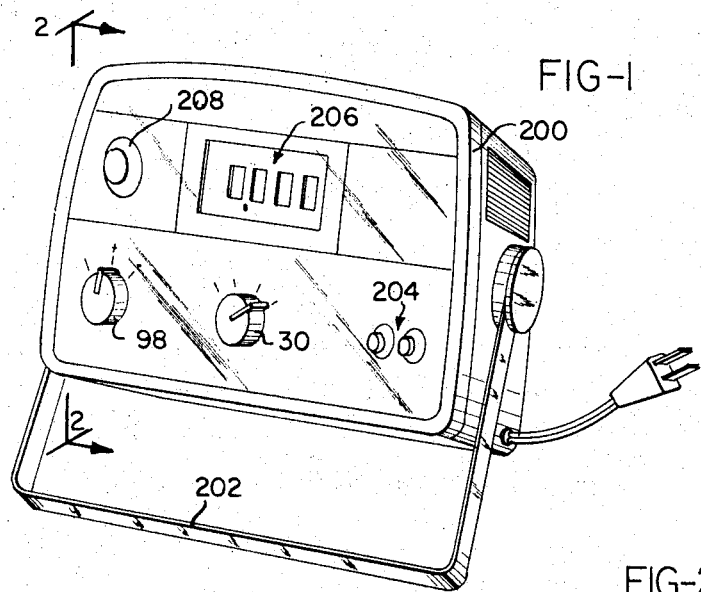
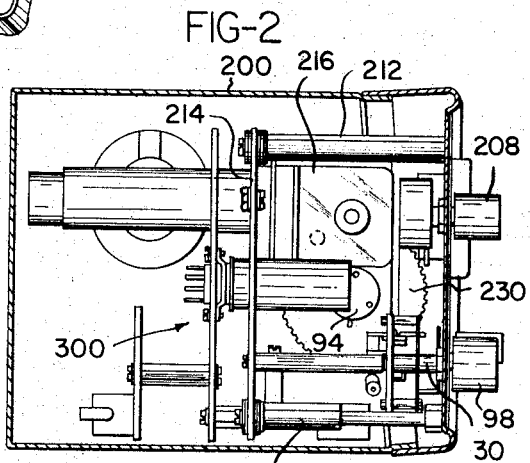
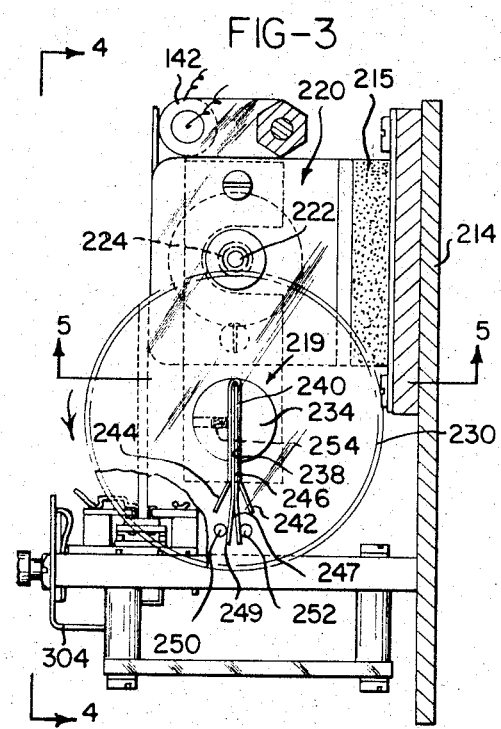
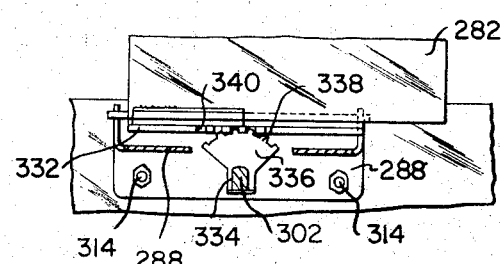
INVENTORS
Jule Hulman and Bernard Fisher
BY
Milton E. Gilbert Oct. 31, 1967
J. HULMAN ET AL
3,350,639
MULTIDIGIT DECIMAL PRESENTATION MEANS FOR DIGITAL METERS
Filed Jan. 9, 1963
2 Sheets-Sheet 2
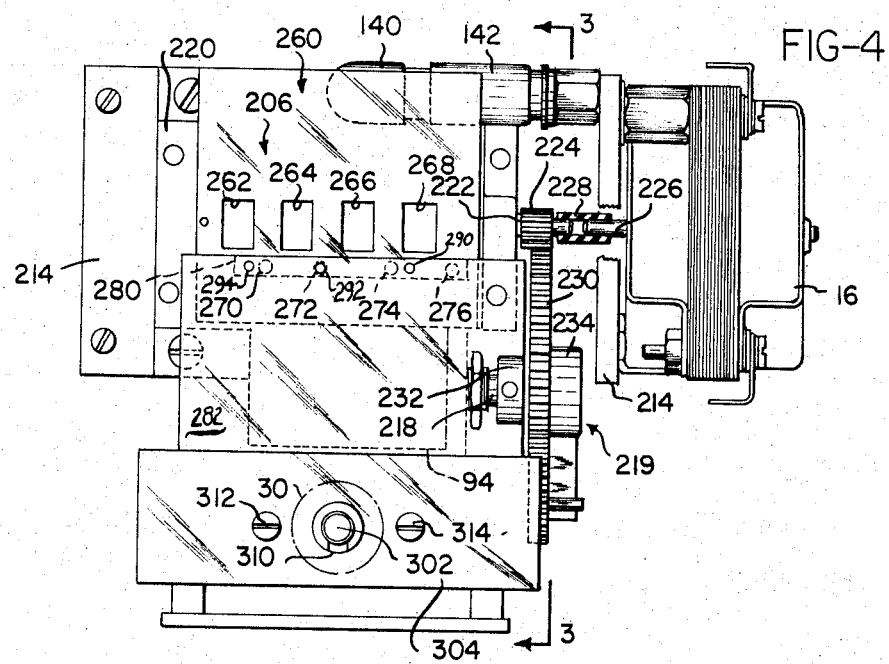
FIG-4
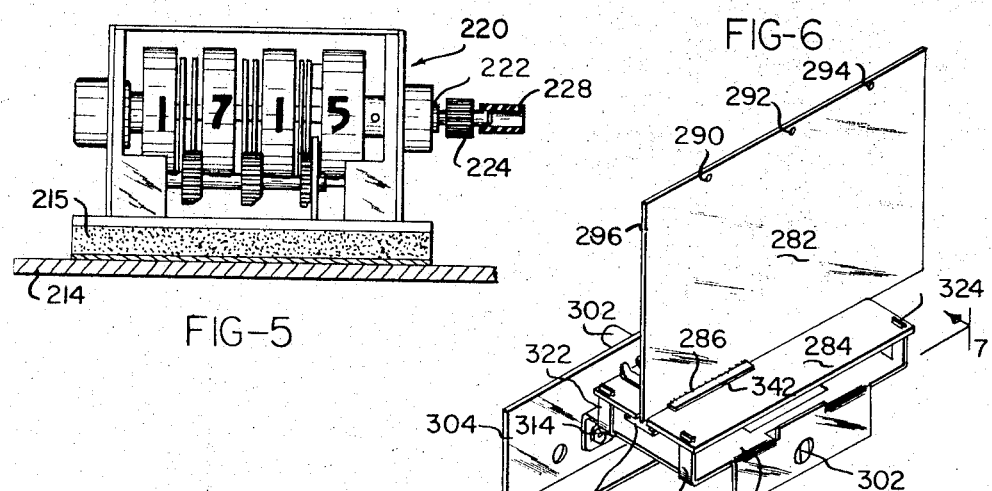
FIG-5
FIG-6
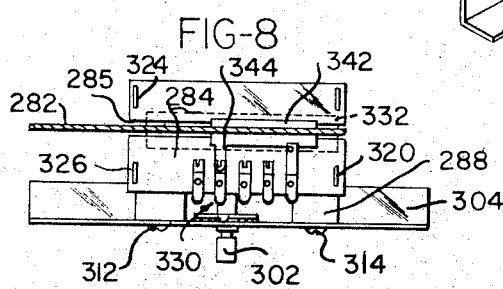
FIG-8
INVENTORS
Jule Hulman and Bernard Fisher
BY
Milton E. Gilbert

United States Patent Office 3,350,639
Patented Oct. 31, 1967

3,350,639
MULTIDIGIT DECIMAL PRESENTATION
MEANS FOR DIGITAL METERS
Jule Hulman and Bernard Fisher, Dayton, Ohio, assignors to United Systems Corporation, Dayton, Ohio, a corporation of Ohio
Filed Jan. 9, 1963, Ser. No. 250,302
6 Claims. (Cl. 324—115)

This invention relates to a digital presentation device, and is more particularly directed to a digital reading meter for measuring volts, amperes, resistance, etc.

Scale type meters which indicate a position on a graduated scale are subject to misreading, especially where it is desired to take readings of changing values. Furthermore, the tolerances inherent in pointer type instruments frequently exceed the allowable tolerances in a quality control program.

It is one object of the invention to provide a digital reading meter which assures high accuracy performance at a minimal cost. A further object of the invention is the provision of an improved digital reading electrical meter which is small and compact, yet provides ease and accuracy of reading even at distances therefrom.

Another object of the invention is to provide in a digital presentation device, decimal presentation means which employ only a single light source; and simple non-electric decimal shifting means.

Still another object of the invention is to provide a drive coupling means for use in a mechanical drive for an instrument such as a digital meter, which has zero backlash and limits the load placed on a control element such as a potentiometer when it reaches its limit position.

These and further objects of the invention will become more readily apparent from a reading of the description following hereinafter, and from an examination of the drawings, in which:

FIG. 1 is a perspective view of one embodiment of a digital voltmeter of the invention;

FIG. 2 is a view partially in cross-section taken along line 2—2 of FIG. 1;

FIG. 3 is a view similar to FIG. 2, but taken from the right side of the instrument as viewed in FIG. 1, i.e., along line 3—3 of FIG. 4;

FIG. 4 is a view taken along line 4—4 of FIG. 3;

FIG. 5 is a view taken along line 5—5 of FIG. 3;

FIG. 6 is a perspective view of the decimal presentation and shifting means of the meter of the invention;

FIG. 7 is a view taken along line 7—7 of FIG. 6; and

FIG. 8 is a top view of the decimal mechanism of FIG. 6.

The physical presentation of the instrument of the invention is depicted in FIGURE 1 as a voltmeter, which comprises a case 200, which may be of an impact resistance material. A carrying handle 202 is provided which is appropriately hinged at the sides of the case 200 to provide a prop for setting the instrument upon a bench at easy reading level, as well as for carrying purposes. The front of the case has mounted therein the polarity reversing switch 98 and the range selection switch 30. Also provided at the front of the case is a zero adjustment control knob 208 and the read out display 206. Jacks 204, 204 are provided for the input signal.

As shown in FIG. 2, the various components are compactly mounted within the case 200. Mounting standoffs 210 and 212 space a mounting plate 214 from the case 200. Affixed to this mounting plate are various components. As shown in FIGS. 4 and 5, a counter mechanism 220 (which may be any of several well known devices which employ rotating counter wheels driven by a geared drive from a common shaft) is affixed to the plate 214 and insulated therefrom by the sound insulating padding 215. The counter shaft 222 is provided with a gear 224 and is directly driven by the output shaft 226 of the motor 16 (see FIG. 4) through a flexible coupling 228. The gear 224 is in mesh with a large gear 230 mounted upon the driven shaft 218 of the potentiometer 94.

A means is provided to absorb inertial torque in the drive from the counter shaft 222 to the potentiometer shaft 218. The gear 230 is rotatably mounted upon the hub 219 on the portion 232. The hub 219 is affixed by set screws to the shaft 218. The transmission of rotational motion from the gear 230 to the shaft 218 is through a spring system shown more clearly in FIG. 3. The hub portion 234 is slotted diametrically as at 238. A relatively stiff back-up spring 240 is fitted within the slot 238. The back-up spring is of deep U-shape and has outward extending arms 242 and 244. Fitted within the back-up spring 240 is a momentum take-up spring 246. The latter spring 246 is of a deep V configuration and is captured within the arms 242 and 244 of the back-up spring 240. Mounted upon the gear 230 are a pair of stop pins 250 and 252. The ends of the spring 246 are located between the stop pins 250 and 252. The dual spring assembly is retained within the slot 238 by a set screw 254 within the hub 234.

Assuming now that the potentiometer shaft 218 has reached the limit of its travel, the shock absorbing spring means serves to absorb energy to limit the potentiometer stop load. If the gear 224 drives the gear 230 in the direction of the arrow as shown in FIG. 3, the leg 242 of the back-up spring 240 contacts the leg 247 of the momentum take-up spring 246 and flexes it away from the pin 252 until it contacts the other leg 249 of the spring 246. Both legs 247 and 249, and the entire spring 246 is then flexed by the back-up spring leg 242. Thus the inertial energy of the drive to the gear 230 is absorbed. The ends 247 and 249 of the spring 246 are preferably pre-biased apart to eliminate relative motion between the parts, or backlash. The pre-load force is at least equal ot or greater than that force necessary to drive the potentiometer shaft 218.

The readout display 206 is coordinated with the range selector switch 30. Mounted upon the plate 214 is a lamp holder 142 (see FIGS. 3 and 4) which contains the bulb 140. This bulb continuously illuminates the counter wheels and the rear of the mask 260. This mask is mounted over the front of the counter wheels, and is provided with a series of openings 262, 264, 266 and 268 corresponding to the number of counter wheels. Below the openings are a series of holes 270, 272, 274 and 276, which are located below and to the right of the respective openings 262, 264, 266 and 268, as viewed in FIG. 4. A diffusing device 280 may be cemented or otherwise fastened to the mask 260 and may be of a white transluscent material. All of the holes 270, 272, 274 and 276 are thus continuously illuminated. In order to display the proper and only one decimal point for each selected range of operation of the instrument, a slide 282 is mounted within a slot 285 in an insulated board 284, as by the cement or solder 286 (see FIGS. 6 and 8). The slide 282 is provided with a series of holes 290, 292 and 294 which are so oriented and spaced with respect to the holes 270, 272, 274 and 276 so that in any operating position of the slide 282 as selected by the switch selector shaft 302 of the selector switch 30, only one of the holes 270, 274 or 276 is uncovered at any given time. The hole 276 of the mask is uncovered when the edge 296 moves past the hole 276, at which time the remaining holes in the mask and slide are not in alignment. In FIG. 4 there is shown a switch position in which the holes 272 and 292 are in alignment, and hence the decimal between the second and third counter wheels is illuminated.

The exact nature of the mounting arrangement for the slide and selector switch is shown in FIGS. 3, 4, 6, 7 and 8. A mounting plate 304 is provided which is affixed to plate 214. A central opening 310 permits the protrusion of the switch operating shaft 302 through the plate 304. A pair of screws 312 and 314 fasten a bracket 288 to the plate 304. The bracket has a series of upstanding legs 320, 322, 324 and 326 at the corners thereof. The legs protrude through the corners of the insulated slotted board 284, which may preferably be made as two separate parts (see FIG. 8). The legs are twisted or spread, or otherwise deformed to retain the board 284 in position. Mounted upon the front portion of the board 284 are a series of lugs 330 for attaching of necessary lead wires.

An insulated T shaped slide 332 is located beneath the board 284. The switch actuator shaft 302 is flatted as at 334 and has mounted thereon an actuator arm 336 provided with a series of teeth 338. These teeth are constantly in mesh with a mating series of teeth 340 formed in the insulated board 332. Although not shown, there may be provided a dual toothed arm arrangement on each side of the slide 332, operated from the shaft 302, for better control and elimination of misalignment problems. A contact bar in substantial U shaped form 342 is fastened to the slide 332. The slide 282 is fastened to one side of the bar 342 as shown in FIG. 6. The other side of the bar 342 has a contact finger 344 which cooperates with the lugs 330 to make the desired circuit. It is thus readily seen that upon rotation of the shaft 302, the teeth on the selector arm 336 will move the slide 332 to simultaneously position the slide 282 for proper decimal display and range or circuit connection between the contact bar 342 and the lugs 330.

While there has been described and illustrated a specific application of the invention to a voltage meter, it is to be readily understood that various modifications and rearrangement of parts may be made by one skilled in the art while still remaining within the spirit and scope of the invention.

What we claim is:
1. In a digital meter having a plurality of operating ranges, in combination:
   a multidigit display means;
   decimal presentation means associated with said display means including a stationary mask and a movable member;
   said mask having a plurality of openings corresponding to a desired number of decimal points to be selectively displayed;
   said meter providing a plurality of decimal point display positions corresponding to said plurality of operating ranges;
   means for selecting a desired decimal point display position;
   said movable member being operatively connected to said selecting means and being so associated and arranged with respect to said mask as to uncover only one opening in said mask for each decimal point display position with only one opening in said mask being uncovered at any operating position of said movable member.

2. The meter of claim 1 in which the movable member also has a plurality of openings therein.

3. The meter of claim 1 in which said means for selecting a desired decimal point display position is a selector switch which also is mechanically connected to select the operating ranges of said meter.

4. In a digital meter having a plurality of operating ranges, in combination:
   a multidigit display means;
   decimal presentation means associated with said display means including a stationary mask and a movable member, said movable member having a plurality of openings therein;
   said mask having a plurality of openings corresponding to a desired number of decimal points to be selectively displayed;
   said meter providing a plurality of decimal point display positions corresponding to said plurality of operating ranges;
   a selector switch for selecting a desired decimal point display position and being connected to select the operating ranges,
   illuminating means for the openings in said mask;
   said movable member being operatively connected to said selecting means and being so associated and arranged with respect to said mask as to uncover only one opening in said mask for each decimal point display position.

5. The meter of claim 4 including translucent means covering the openings in said mask.

6. The meter of claim 4 wherein said multidigit display means comprises a counter;
   said mask being affixed in front of said counter, said movable member consisting of a perforated slide arranged immediately in front of said mask, and said illuminating means being arranged to illuminate the openings in said mask.

References Cited
UNITED STATES PATENTS

| | | | |
|---|---|---|---|
| 2,329,218 | 9/1943 | Reynolds | 235—63 |
| 2,889,518 | 6/1959 | Hudson et al. | 324—99 XR |

ARCHIE R. BORCHELT, *Primary Examiner.*

WALTER L. CARLSON, *Examiner.*

E. F. KARLSEN, G. L. LETT, *Assistant Examiners.*